US009278659B2

(12) United States Patent
Schondorf et al.

(10) Patent No.: US 9,278,659 B2
(45) Date of Patent: Mar. 8, 2016

(54) BUMPER COMPONENT WITH EMBEDDED SENSOR

(71) Applicant: FORD GLOBAL TECHNOLOGIES, LLC, Dearborn, MI (US)

(72) Inventors: Steven Yellin Schondorf, Dearborn, MI (US); Abraham G. Philip, Rochester Hills, MI (US); Mahmoud Yousef Ghannam, Canton, MI (US); Markus Hagen, Cologne (DE); Thomas Arndt, Odenthal (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/258,713

(22) Filed: Apr. 22, 2014

(65) Prior Publication Data

US 2015/0298635 A1 Oct. 22, 2015

(51) Int. Cl.

| *B60R 21/0134* | (2006.01) |
| *B60R 19/48* | (2006.01) |
| *B60R 19/02* | (2006.01) |
| *B29C 45/14* | (2006.01) |
| *B29C 45/16* | (2006.01) |
| *B60R 21/00* | (2006.01) |

(Continued)

(52) U.S. Cl.
CPC ....... *B60R 21/0134* (2013.01); *B29C 45/14819* (2013.01); *B29C 45/1671* (2013.01); *B60R 19/023* (2013.01); *B60R 19/483* (2013.01); *B29L 2031/3044* (2013.01); *B29L 2031/34* (2013.01); *B60R 2021/0004* (2013.01); *B60R 2021/0011* (2013.01)

(58) Field of Classification Search
CPC ...... B60R 19/02; B60R 19/023; B60R 19/03; B60R 19/483; B60R 2019/184; B60R 21/0134; B60R 21/0136; B60R 21/013; B60R 21/01; B60R 2021/01006; B60R 2021/01013; B29C 45/14819; B29C 45/14336; B29C 45/1671; B29L 2031/3044
See application file for complete search history.

(56) References Cited

U.S. PATENT DOCUMENTS

| 3,774,938 A | * | 11/1973 | Orlando | ......................... 280/735 |
| 5,478,051 A | * | 12/1995 | Mauer | ................... B25B 23/045 |
| | | | | 264/154 |

(Continued)

FOREIGN PATENT DOCUMENTS

DE 102007057259 A1 * 5/2009

OTHER PUBLICATIONS

Machine Translation of DE102007057259A1. Retrieved Jun. 28, 2015.*

*Primary Examiner* — Barry Gooden, Jr.
(74) *Attorney, Agent, or Firm* — Frank A. MacKenzie; Brooks Kushman P.C.

(57) ABSTRACT

Exemplary methods of making a bumper component are disclosed, along with exemplary bumper assemblies and vehicles. An exemplary method may include providing a first mold portion defining at least in part a front surface, and positioning at least one sensor in the first mold portion. Exemplary methods may further include enclosing the at least one sensor within the first mold portion with a second mold portion. The second mold portion may define at least in part a rear surface. The method may further include forming a body within the first and second mold portions, thereby embedding the at least one sensor between the front and rear surfaces, the body extending between the front and rear surfaces.

18 Claims, 4 Drawing Sheets

(51) Int. Cl.
 *B29L 31/34* (2006.01)
 *B29L 31/30* (2006.01)

(56) References Cited

U.S. PATENT DOCUMENTS

| | | | |
|---|---|---|---|
| 6,009,970 A * | 1/2000 | Breed | 180/274 |
| 6,203,366 B1 * | 3/2001 | Muller et al. | 439/561 |
| 6,318,774 B1 * | 11/2001 | Karr et al. | 293/117 |
| 7,331,415 B2 | 2/2008 | Hawes et al. | |
| 7,384,082 B2 | 6/2008 | Blake | |
| 9,004,578 B1 * | 4/2015 | Ghannam et al. | 296/191 |
| 2002/0190850 A1 * | 12/2002 | Nishimoto et al. | 340/435 |
| 2003/0143351 A1 * | 7/2003 | Kannari et al. | 428/35.7 |
| 2006/0267359 A1 * | 11/2006 | Blake | 293/120 |
| 2008/0100046 A1 * | 5/2008 | Hayakawa et al. | 280/735 |
| 2008/0315050 A1 | 12/2008 | Buckley et al. | |
| 2011/0169251 A1 | 7/2011 | Arndt et al. | |
| 2012/0291254 A1 * | 11/2012 | Say | A61B 5/14532 29/426.2 |

* cited by examiner

BUMPER COMPONENT WITH EMBEDDED SENSOR

BACKGROUND

The development of pedestrian sensing technology in vehicles has led to a variety of new hardware and software that is employed to facilitate detection of the presence of or an impact with a pedestrian or other small object. Typically, part of the hardware required in such systems includes sensors that are capable of detecting a proximity of pedestrians or other small objects near a vehicle, or detecting an impact of a pedestrian or other small object with a vehicle. For example, sensors may be positioned about the exterior of a vehicle, e.g., along front or rear bumpers.

Current efforts to provide sensors along exterior components includes mounting sensors to the bumper fascia or outer "skin" of the vehicle, or to energy absorbing components of the bumper, or other bumper components. Essentially, the sensors are external components that are installed onto the bumper component. Packaging, mounting, and attaching the existing sensors is difficult and challenges the assembly plant and service facilities.

Accordingly, there is a need for an improved bumper assembly that addresses the above shortcomings.

SUMMARY

Exemplary illustrations are provided of a vehicle, which may include a bumper assembly positioned at one of a front and a rear end of the vehicle. The bumper assembly may include a molded body formed from a flow of heated material between a front surface and a rear surface, and at least one sensor inserted in the material flow such that the sensor is embedded in the body between the front and rear surfaces and bonded with the material forming the molded body. The sensor may be configured to sense at least one of an external object presence adjacent the body and an external object impact with the body. The vehicle may also include a sensing system in communication with the at least one sensor, the sensing system configured to deploy at least one countermeasure in response to the at least one of the external object presence adjacent the body and the external object impact with the body.

Exemplary methods described herein may include providing a first mold portion defining at least in part a front surface, and positioning at least one sensor in the first mold portion. Exemplary methods may further include enclosing the at least one sensor within the first mold portion with a second mold portion. The second mold portion may define at least in part a rear surface. The method may further include molding a body by flowing a heated material within the first and second mold portions, thereby embedding the at least one sensor between the front and rear surfaces and bonding the sensor with the heated material, the body extending between the front and rear surfaces.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present disclosure are described in detail by referring to the drawings as follows.

DETAILED DESCRIPTION

Figure 1:
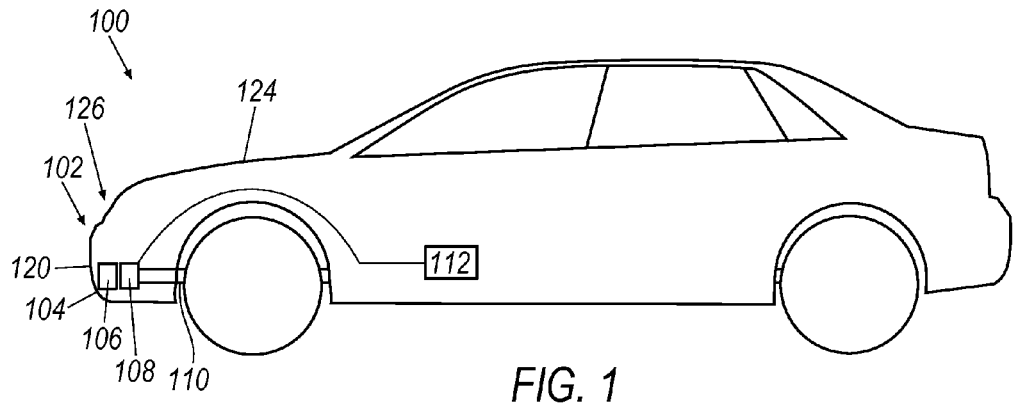
FIG. 1 is an illustration of a vehicle having a bumper assembly, according to one exemplary illustration.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the disclosure to the precise form and configuration shown in the drawings and disclosed in the following detailed description.

Turning now to FIG. 1, an exemplary vehicle 100 is illustrated. Vehicle 100 may include a bumper assembly 102 disposed at either end of the vehicle. For example, as shown in FIG. 1 the bumper assembly 102 may be generally disposed at the front of the vehicle. While the bumper assembly 102 is shown at the front of the vehicle, other exemplary approaches may be directed to a bumper, component, or fascia positioned anywhere else on the vehicle 100, e.g., at the rear or sides of the vehicle 100. Exemplary illustrations involving bumpers or fascias positioned along the front, rear, or sides of the vehicle 100 may incorporate sensors or other components useful for such applications, such as radar sensors, active safety sensors, parking aids, backup camera sensors, or the like, merely as examples.

The front bumper assembly 102 may be configured to absorb low-speed impacts with objects such as other vehicles. As will be described in further detail in FIGS. 2A-2C, the bumper assembly 102 may include a fascia 104, an energy absorbing element 106, and a bumper structure 108. The bumper structure 108 may include a beam or other structural element configured to support energy absorbing elements 106 and the fascia 104. The fascia 104 may generally define an outer surface of the bumper assembly 102 and/or the vehicle 100. More specifically, as shown in FIG. 1, the fascia 104 defines an outer or front surface 120. The front surface 120 will be described further below in connection with exemplary methods of forming bumper components such as the fascia 104.

Any of the fascia 104, the energy absorbing element 106, and/or the bumper structure 108 may be formed of a molded material. For example, as will be described further below, each of these components may be formed by generally molding a body to form the desired part, e.g., by flowing a heated material which is subsequently cooled, allowing the body to harden or cure. As will be described further below, first and second mold portions may be provided to enclose the molded body and facilitate the molding process. At least one sensor may be embedded in the flow of material that occurs during the molding process. In one example, a sensor is embedded between front and rear surfaces defined by the mold portions. A support mechanism or structure may be provided as well, thereby allowing the sensor to be maintained in a desired position during the molding process despite the flow of material occurring around the sensor. Accordingly, the sensor position may be generally consistent within the molded part during the process and may be resistant to shear forces, gravity, or other forces acting on the sensor during the molding process. Support structures may provide mechanical support or other support, e.g., via magnetic forces, thereby generally resisting the forces imparted upon the sensor by gravity and the flowing material. The molding process generally bonds the sensor with the heated material. Accordingly, upon completion of the molding process, the molded body may transfer substantially all of an impact load from the molded body to the sensor, which may facilitate sensing of impacts, e.g., with pedestrians or other objects.

The energy absorbing element 106 may be formed of any material configured to absorb energy, e.g., in a crash of the vehicle 100. Merely as examples, the energy absorbing element 106 may be formed of a plastic, foam, or expanded metal material. As will be described further below, in some exemplary approaches, the energy absorbing element 106 may be formed of a material that is capable of being molded about other components of the vehicle 100, e.g., sensors, leads, or the like that is associated with a vehicle sensing system. Moreover, energy absorbing element 106 may have any configuration or shape that is convenient, including, but not limited to, a C-shaped channel shape in section, a closed section, or a solid or filled section.

Vehicle 100 may also include a sensing system configured to facilitate detection of objects around the vehicle, e.g., which may be likely to contact the vehicle 100. Alternatively or in addition, the sensing system may be configured to detect impacts of pedestrians of other objects with the vehicle 100. In one exemplary illustration, the sensing system generally includes an electronic control unit (ECU) 112 and a plurality of sensors 114 (not shown in FIG. 1) in communication with the ECU 112. The sensors 114 may include accelerometer-type sensors, e.g., which sense an impact, or may alternatively include radar or cameras, merely as examples. In another example, the sensing system is generally configured to sense a proximity of or an impact with objects such as pedestrians or other small objects with the vehicle 100. Moreover, the sensing system may generally be configured to trigger one or more countermeasures in response to sensing an adjacent pedestrian or impact with the pedestrian. Merely by way of example, the ECU 112 may be configured to deploy energy absorbing elements around the front of the vehicle, e.g., to absorb energy, and thus reduce likelihood of severe injury on the pedestrian as a result of a collision or impact with vehicle 100. In one exemplary approach, the hood 124 of vehicle 100 is configured to move upward in order to facilitate absorption of any impact energy of a pedestrian or other object with the vehicle 100. In another exemplary illustration, the hood 124 is configured to selectively deploy energy absorbing elements, e.g., one or more airbags. In still another example, the vehicle 100 may deploy energy absorbing elements around the front grille area 126 of the vehicle 100. Accordingly, exemplary countermeasures that may be triggered or deployed by the vehicle 100 may include energy absorbing elements or other devices that are configured to reduce injury that may result from an impact with the vehicle 100. In other exemplary illustrations, a latch or hinge associated with the hood 124 may deploy, thereby increasing a gap or space between the hood 124 and an engine (not shown). In this manner, hard contact between the vehicle and, for example, a pedestrian, may be minimized by the additional space between the hood 124, which may deform or absorb impact energy, and the engine or other objects, which may not as easily deform or absorb impact energy.

Figure 2A:
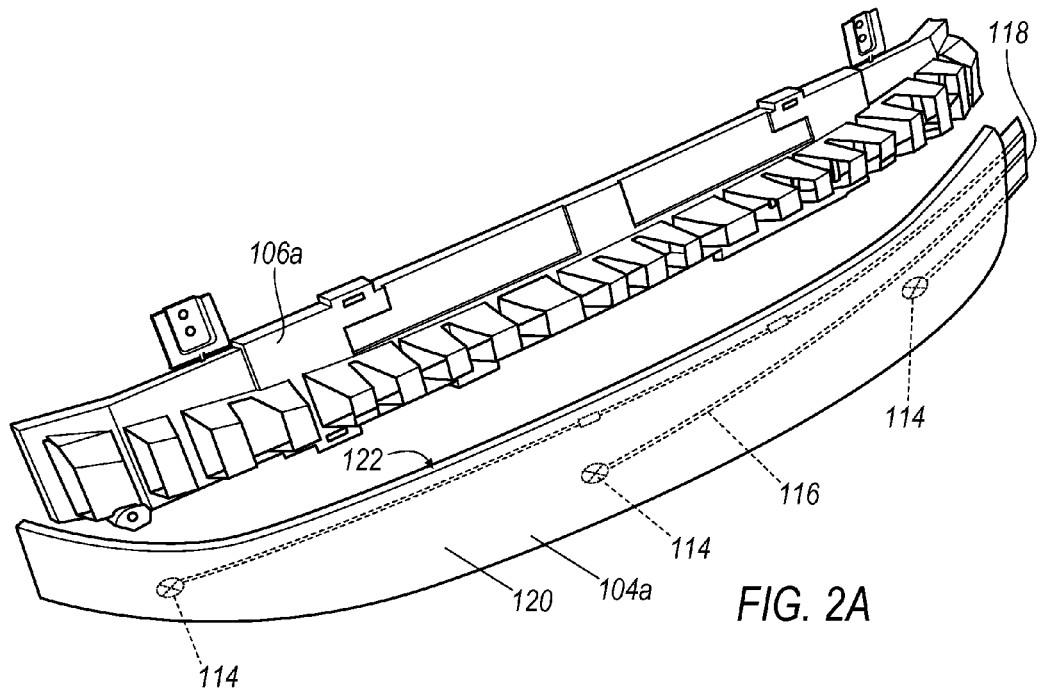
FIG. 2A is an illustration of a bumper assembly, according to one exemplary illustration.
Figure 2B:
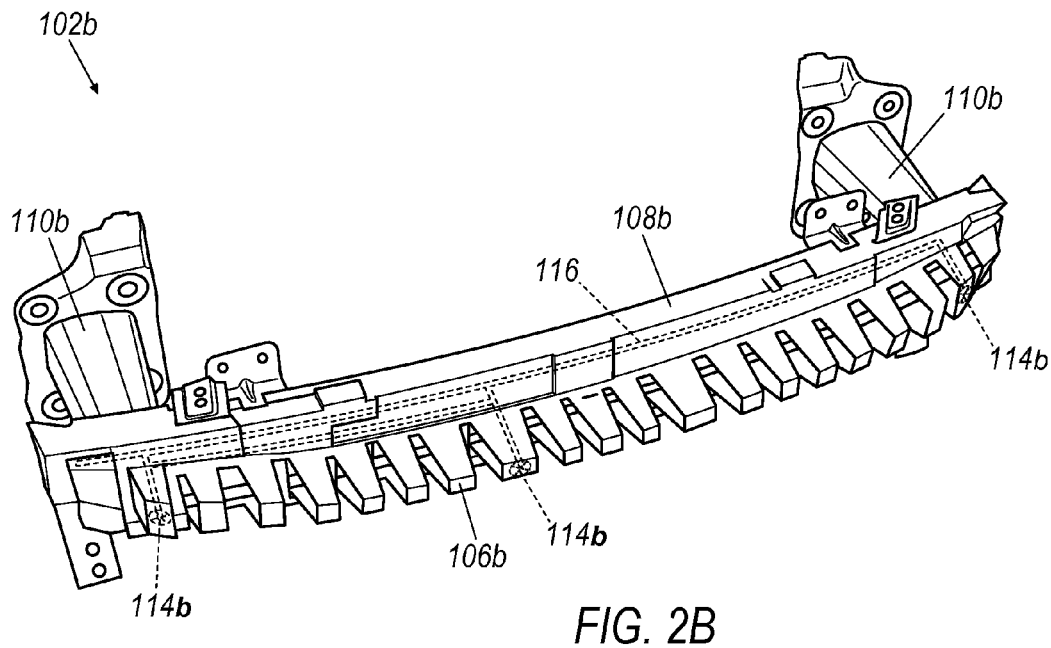
FIG. 2B is an illustration of a bumper assembly, according to another exemplary illustration.
Figure 2C:
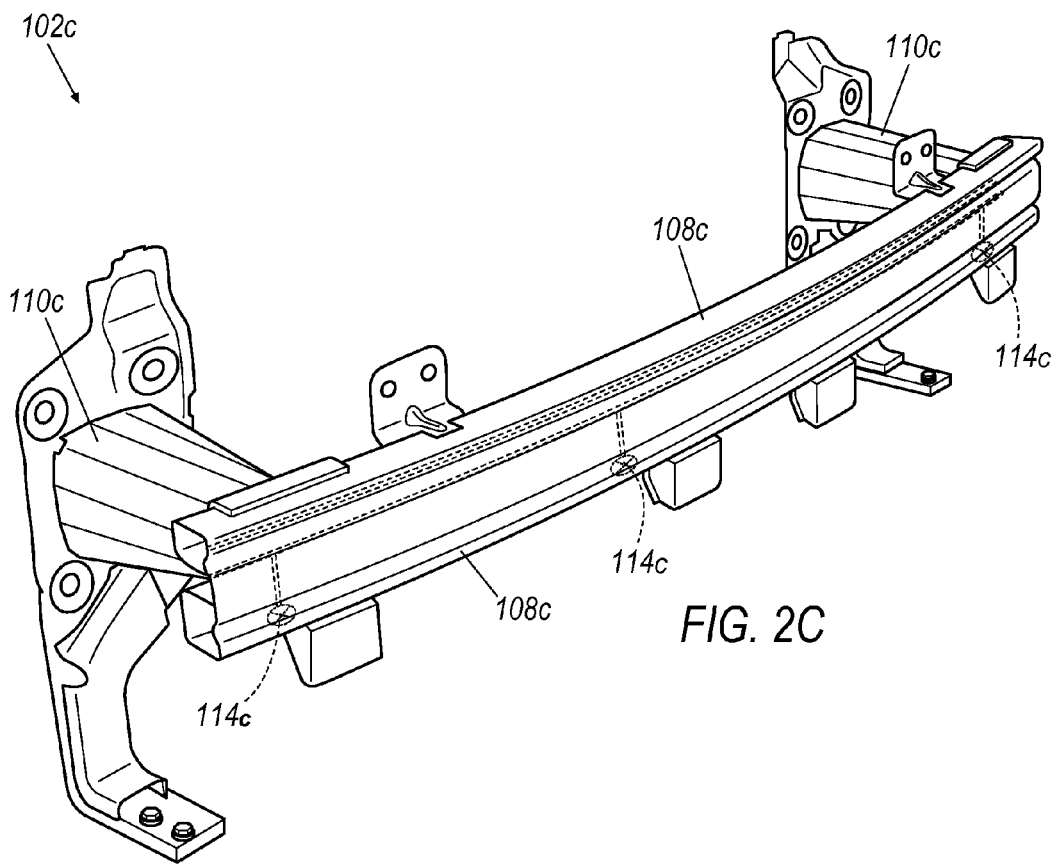
FIG. 2C is an illustration of a bumper assembly, according to another exemplary illustration.

Turning now to FIGS. 2A, 2B, and 2C, exemplary bumper assemblies 102 are described in further detail. For example, in FIG. 2A, an exemplary bumper assembly includes a fascia 104a and an energy absorbing structure 106a. A plurality of sensing elements, such as sensors 114 are embedded within the fascia 104a. Moreover, circuitry such as electrical wires or leads 116 and/or connector 118 may be generally formed or integrated directly into the fascia 104a. Lead 116 can include fuses, or any other circuitry or elements of the sensing system that are convenient. In this manner, the sensors 114 are generally integrated within a body or component of a bumper assembly 102. As noted above, the fascia 104a may generally define a front surface 120 and a rear surface 122. The front and rear surfaces 120, 122 may generally correspond to features of an exemplary mold that may be used to form the fascia 104a, as will be described further below.

Turning now to FIG. 2B, another exemplary bumper assembly 102b is illustrated. Bumper assembly 102b may generally include a fascia (not shown), an energy absorbing structure 106b, and a bumper structural beam 108b. The structural beam 108b is generally attached to the frame portion 110b. Sensing elements 114b are generally integrated into the energy absorbing structure 106b. In other words, the sensing elements 114b are generally integrated directly into a body which forms the energy absorbing structure 106b.

Turning now to FIG. 2C, another exemplary bumper assembly 102c is illustrated. Bumper assembly 102c may comprise a fascia (not shown), an energy absorbing structure (not shown), and a structural beam 108c. The structural beam 108c may be secured to a vehicle frame structure by way of the front frame portion 110c. A plurality of sensing elements 114c are shown integrated into the structural beam 108c. Moreover, electrical lead 116 or other wires connecting the sensing elements 114c to each other and or to ECU 112 may also be integrated directly into the structural beam 108c, e.g., by molding the sensors 114 within the structural beam 108c. As will be described further below, the structural beam 108c may generally be molded with the sensing elements 114c integrated within the molded part. In this manner, the sensors 114 are integrated within a body, which in this case may be the structural beam 108c.

Figure 3A:
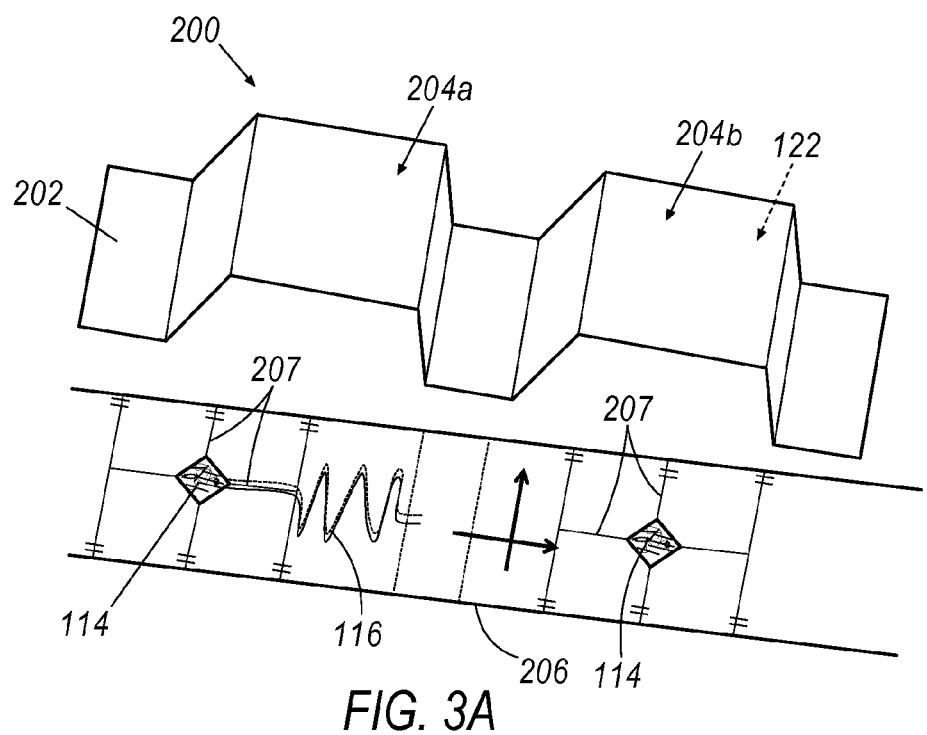
FIG. 3A is an illustration of an exemplary mold portion.
Figure 3B:
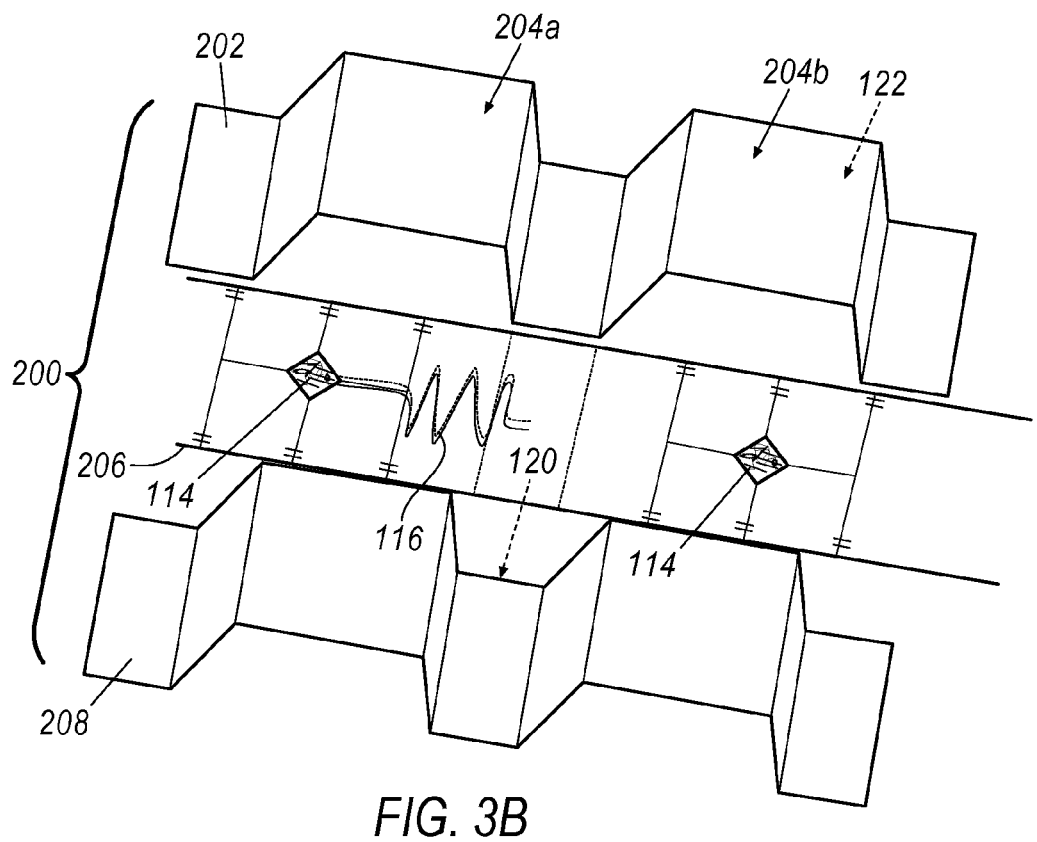
FIG. 3B is an illustration of the exemplary mold portion of FIG. 3A after receiving a sensor and a support structure therein.
Figure 3C:
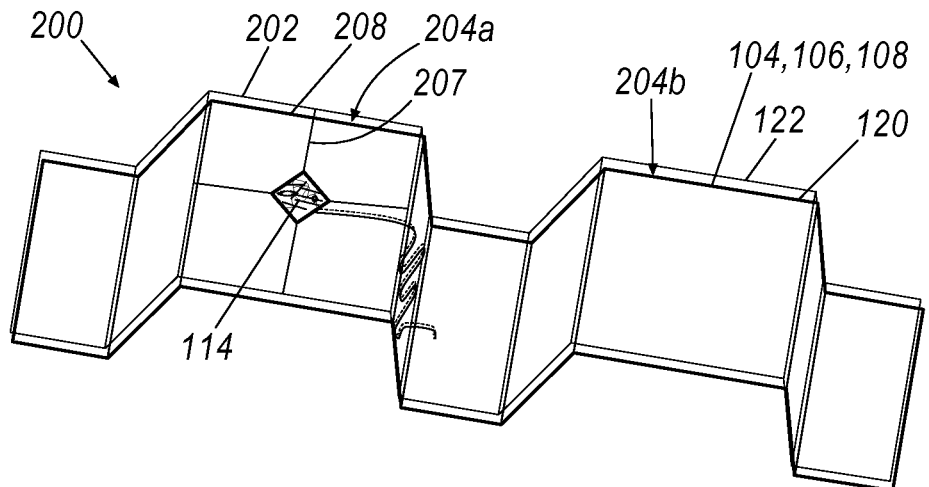
FIG. 3C is an illustration of the exemplary mold portion of FIGS. 3A and 3B after a second mold portion encloses the sensor and support structure.

Turning now to FIGS. 3A, 3B and 3C, an exemplary method of forming a bumper components, such as the fascia 104, the energy absorbing element 106, and or the bumper structure 108, is described in detail. In this exemplary approach, a mold assembly 200 may generally be used to form a molded body, i.e., the fascia 104, the energy absorbing element 106, or the bumper structure 108 with the sensors or sensing elements, such as the sensor 114 may be incorporated within a body portion of these components. Mold assembly 200 may include a first mold portion 202, as shown in FIG. 3A. The first portion 202 defines one or more cavities. For example, as shown in FIG. 3A, two cavities 204a and 204b are illustrated. The mold assembly 200 may further include a support structure 206, which generally supports at least the sensors 114 and may also optionally support a wiring harness or lead 116. The lead 116 may generally connect the sensors 114 to each other and/or to the sensing system of a vehicle 100. The support structure 206 may include a plurality of support elements 207 that generally maintain a position of the sensors 114 in all three dimensions within the cavities 204. The sensors 114 may generally be laid upon or otherwise supported by the support structure 206 within the first mold portion 202.

Turning now to FIG. 3B, the mold assembly 200 may include a second mold portion 208. The second mold portion 208 may generally correspond to the first mold portion 202. For example, the first and second mold portions 202, 208 may generally define a volume, which receives the support structure 206. The first and second mold portions 202, 208 may receive molded material which, when the molded body is created, generally flows around the sensors 114 thereby embedding the sensors 114 within the body. Additionally, the first mold portion 202 may generally correspond to a rear surface 122, e.g., of the fascia 104. Similarly, the second mold portion 208 may generally correspond to a front surface 120 of the fascia 104.

Proceeding to FIG. 3C, the mold assembly 200 is generally enclosed, such that the second mold portion 208 encloses the sensors 114 within the volume defined between the first and second mold portions 202 and 208. Accordingly, the sensors 114 are generally maintained within the cavities 204a and 204b defined by the first and second mold portions 202 and 208. In some exemplary approaches, the support structure 206 may be a netting or other flexible structure, which generally supports the sensing elements 114 within the mold assembly 200 when the mold assembly 200 is closed. The netting may be formed of a material that generally is melted away or evaporated, e.g., by the heat of the molding process. In other exemplary illustrations, support structure 206 may generally be stiff such that it remains within the molded body, thereby lending additional stiffness or structure to the molded body.

In some exemplary approaches, a process for assembling or manufacturing the support structure 206 and/or associated elements such as the sensors 114, leads 116, or the like, may include a feeding process where the sensing elements 114, leads 116, etc. are assembled to the support structure 206, e.g., horizontally or vertically through a rolling mechanical mechanism, or are inserted into the support structure 206 by a robotic system (not shown). Moreover, the support structure 206 may be subsequently assembled or positioned within the mold assembly 200 in a similar manner.

In another exemplary illustration, sensors 114, leads 116, or the like may be positioned within the mold assembly 200 by a magnetic controller (not shown), which generally maintains a position of the sensors 114, leads 116, etc. within the mold assembly 200. For example, first and second electromagnets (not shown) may be provided above and below the mold assembly 200 when it is in the closed position. One or both of the first and second electromagnets may selectively actuate a magnetic field, thereby acting upon elements within the mold assembly 200, e.g., sensors 114 or the like. Accordingly, a position of the elements such as the sensors 114, leads 116, or the like may be more accurately controlled, e.g., while the mold assembly 200 is closed. Moreover, in such examples a support structure 206 may not be necessary.

The support structure 206 may generally be used to position the sensors 114 anywhere within a body portion of a bumper component. For example, the sensor 114 may be positioned such that is flush with the front surface 120 of the fascia 104. This may be convenient, for example, where is desired to put a sensor that relies upon a field of view, such as a camera or radar in the bumper assembly 102.

In one exemplary illustration, sensing elements 114 are incorporated within sensor capsules, e.g., which correspond to the cavities 204. The capsules may generally define spaces about the sensors 114 or other components. The capsules may be incorporated around the sensors to provide insulation or mechanical protection of the sensors 114 lead 116 and/or connector 118, for example. In examples where a field of view is desired for a given sensor 114, the sensor capsules may generally be filled with a translucent or transparent material to facilitate a field of view from the sensor 114. Other materials may be incorporated into the capsules, e.g., to generally surround the sensors 114 or other components within the capsule to protect the sensors 114 or other components from damage.

Generally, integration of sensor 114 within a body portion, e.g. the fascia 104, the energy absorbing element 106, or the bumper structure beam 108, may provide a more direct interaction between the sensor 114 and a first in line physical variables of the vehicle 100 during impact. Accordingly, the sensing system may generally more accurately sense an impending impact or an impact that has occurred since the sensors 114 are integrated directly into a body portion of a bumper element. Errors in sensing impacts may be reduced as a result of the fact that the sensing elements 114 are incorporated directly into a bumper component and thus are not separately attached to a bumper structure. By contrast, where sensors are secured to outer surfaces or interior portions of bumper components, the attachment structures themselves may fail or fatigue over time, which may increase likelihood of sensing errors.

While the above description has been directed to the incorporation of pedestrian sensing elements, i.e., sensors 114 or sensing elements 114b or 114c that are configured to detect or determine the presence or impact of a vehicle 100 with the pedestrian, this is merely one exemplary approach and virtually any component or sensor or other microelectronic device may be incorporated within a body of a bumper component.

Figure 4:
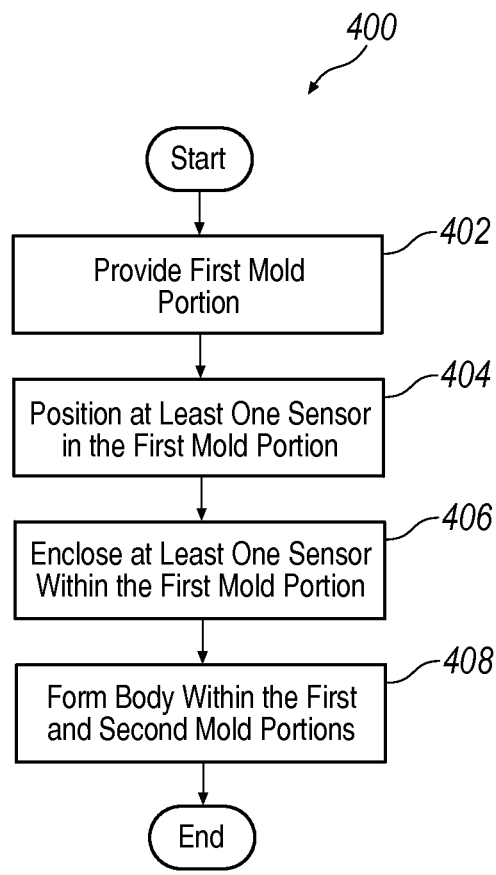
FIG. 4 is a process flow diagram for an exemplary method of forming a bumper fascia.

Proceeding to FIG. 4, an exemplary process 400 of making a bumper component is described. Process 400 may generally begin at block 402, where a first mold portion is provided. For example, as described above a first mold portion 202 may be provided that defines in part a front surface 120 of a bumper fascia 104.

Proceeding to block 404, at least one sensor may be positioned within the first mold portion. For example, as described above, one or more sensors 114 may be positioned within the first mold portion 202. In one exemplary illustration, one or more sensors 114 may be positioned within the cavity 204a and/or 204b that are defined in part by the first mold portion 202. The sensors 114 and/or associated hardware, e.g., the leads 116 and/or connectors 118, may be supported by a support structure 206 within the mold assembly 200. For example, the support structure 206 may comprise support elements 207 which generally maintain a position of the sensors 114 within the mold assembly 200.

Proceeding to block 406, the sensors 114 may generally be enclosed within the first mold portion. For example, a second mold portion 208 as described above may generally enclose the sensors 114 within the first mold portion 202, which may be stationary. In one exemplary approach, support structure 206 extends outwardly from the mold assembly 200 such that the closing of the second mold portion 208 on the first mold portion 202 generally clamps the support structure 206 between the two mold portions 202 and 208. Accordingly, a position of the sensors 114 is generally maintained within the cavities 204. Additionally, as noted above, the second mold portion 208 may generally correspond to a front surface, e.g., front surface 120 of a fascia 104. The support structure 206 may thereby generally position the sensors 114, the leads 116, and/or connectors 118 within the mold assembly 200, thereby ensuring proper positioning of the sensor within a body that is formed by the mold assembly 200. Process 400 may then proceed to block 408.

At block 408, a body may be formed within the first and second mold portions. For example, as described above, the fascia 104, the energy absorbing element 106, the bumper structure 108, or the structural beam may be formed within the first and second mold portions 202 and 208. For example, an injection molding process may be used to form a bumper component within the first and second mold portions 202 and 208. Additionally, as noted above, in some exemplary approaches a sensor capsule may be provided that generally encloses the sensor 114. The sensor capsule may generally be embedded within the body between the front and rear surfaces, e.g., of the fascia 104.

In some exemplary approaches, the exemplary methods described herein may employ a computer or a computer readable storage medium implementing the various methods and processes described herein, e.g., process 400. In general, computing systems and/or devices may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The exemplary illustrations are not limited to the previously described examples. Rather, a plurality of variants and modifications are possible, which also make use of the ideas of the exemplary illustrations and therefore fall within the protective scope. Accordingly, it is to be understood that the above description is intended to be illustrative and not restrictive.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims or disclosure.

Accordingly, it is to be understood that the above description is intended to be illustrative and not restrictive. Many embodiments and applications other than the examples provided would be upon reading the above description. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the disclosure is capable of modification and variation.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed, is:

1. A bumper assembly, comprising:
   a molded body formed from a flow of heated material between a front surface and a rear surface; and
   at least one sensor positioned by a netting support structure extending longitudinally within the material flow such that the at least one sensor and the support structure are embedded between the front and rear surfaces and bonded with the material forming the molded body, the support structure configured to provide structural rigidity to the molded body.

2. The bumper assembly of claim 1, further comprising an electrical connector and an electrical lead in communication with the at least one sensor, the electrical lead embedded within the molded body and extending along a longitudinal length thereof and such that the electrical connector is located at one of two ends of the molded body.

3. The bumper assembly of claim 1, wherein the at least one sensor is flush with the front surface of the molded body.

4. The bumper assembly of claim 1, wherein the at least one sensor is a pedestrian sensor configured to sense one of a pedestrian presence adjacent the front surface of the molded body and a pedestrian impact with the front surface of the molded body.

5. The bumper assembly of claim 1, wherein the molded body is one of a bumper fascia defining an outer surface of the bumper assembly, an energy-absorbing structure, and a structural element of the bumper assembly.

6. The bumper assembly of claim 1, wherein the at least one sensor includes a plurality of sensors.

7. The bumper assembly of claim 6, further comprising an electrical lead connecting the plurality of sensors to each other.

8. The bumper assembly of claim 1, further comprising a sensor capsule enclosing the at least one sensor, the sensor capsule embedded within the molded body and positioned between the front and rear surfaces.

9. The bumper assembly of claim 8, wherein the sensor capsule includes a window positioned to allow the at least one sensor a field of view beyond the front surface of the molded body.

10. A vehicle, comprising:
    a bumper assembly, including:
       a molded body formed from a flow of heated material between a front surface and a rear surface,
       a netting support structure longitudinally extending between the front surface and the rear surface and having support members, and
       at least one sensor positioned by the support structure in the material flow between the front and rear surfaces and bonded with the material forming the molded body, the support members configured to strengthen a rigidity of the molded body and the at least one sensor configured to sense at least one of an external object presence and an external object impact with the molded body; and
    a sensing system in communication with the at least one sensor, the sensing system configured to deploy at least one countermeasure in response to the at least one of the external object presence adjacent the molded body and the external object impact with the molded body.

11. The vehicle of claim 10, further comprising an electrical lead connecting the sensor to an electrical connector, wherein the electrical lead is embedded within the molded body and extends along a longitudinal length of the molded body such that the electrical connector is located at one of two ends of the molded body.

12. The vehicle of claim 10, wherein the bumper assembly is positioned at one of a front end and a rear end of the vehicle.

13. The vehicle of claim 10, further comprising a sensor capsule enclosing the sensor, the sensor capsule embedded within the molded body between the front and rear surfaces.

14. The vehicle of claim 13, wherein the sensor capsule includes a window positioned to allow the at least one sensor a field of view beyond the front surface of the molded body.

15. A method of forming a bumper fascia, comprising:
    providing a first mold portion defining at least in part a front surface;
    providing a netting support structure longitudinally extending along the first mold portion;
    positioning, by the support structure, at least one sensor in the first mold portion, the at least one sensor configured to sense at least one of an external object presence adjacent the fascia and an external object impact with the fascia;
    positioning, by the support structure, at least one electrical lead in electrical connection with the at least one sensor and such that the electrical lead extends along a longitudinal length of the first mold portion;
    enclosing the at least one sensor and the support structure within the first mold portion with a second mold portion, the second mold portion defining at least in part a rear surface; and
    molding a body by flowing a heated material within the first and second mold portions, thereby embedding the at least one sensor and support structure between the front and rear surfaces and bonding the at least one sensor with the heated material, the body extending between the front and rear surfaces and the support structure structurally reinforcing the body.

16. The method of claim 15, further comprising maintaining a position of the at least one sensor within the body with the support structure while the body is formed.

17. The method of claim 15, further comprising supporting the at least one sensor within the first and second mold portions with one of a mechanical and a magnetic force configured to maintain the support structure in a position and to resist the flowing of the heated material to maintain the position of the at least one sensor.

18. The method of claim 15, wherein the at least one sensor is bonded with the body such that the body transfers substantially all of an impact load from the body to the at least one sensor.

* * * * *